United States Patent [19]

Gupta et al.

[11] Patent Number: 5,493,107
[45] Date of Patent: *Feb. 20, 1996

[54] SHELF PRICE LABEL AND PRODUCT PLACEMENT VERIFICATION METHOD AND APPARATUS

[75] Inventors: Om P. Gupta; Robert C. Ricketson, both of Ithaca, N.Y.

[73] Assignee: Digicomp Research Corporation, Ithaca, N.Y.

[21] Appl. No.: 324,902

[22] Filed: Oct. 18, 1994

Related U.S. Application Data

[63] Continuation-in-part of Ser. No. 58,426, May 7, 1993, Pat. No. 5,382,779.

[*] Notice: The term of this patent shall not extend beyond the expiration date of Pat. No. 5,382,779.

[51] Int. Cl.⁶ .............................. G06K 15/00; G06K 7/10
[52] U.S. Cl. .................. 235/383; 235/472; 235/375; 235/378; 235/385; 235/494; 364/401; 364/464.01
[58] Field of Search ..................... 235/383, 385, 235/378, 472, 494, 462; 364/401, 464.01

[56] References Cited

U.S. PATENT DOCUMENTS

| | | | |
|---|---|---|---|
| 4,549,750 | 10/1985 | Stone et al. | 238/79 |
| 4,654,514 | 3/1987 | Watson et al. | 235/383 |
| 4,720,785 | 1/1988 | Shapiro | 364/401 |
| 4,857,716 | 8/1989 | Gombrich et al. | 235/462 |
| 5,065,002 | 11/1991 | Tashiro et al. | 235/472 |
| 5,111,196 | 5/1992 | Hunt | 340/825.35 |
| 5,128,520 | 7/1992 | Rando et al. | 235/375 |
| 5,172,314 | 12/1992 | Poland et al. | 364/401 |
| 5,227,617 | 7/1993 | Christopher et al. | 235/462 |
| 5,241,467 | 8/1993 | Failing et al. | 235/383 |
| 5,250,789 | 10/1993 | Johnsen | 235/383 |
| 5,311,000 | 5/1994 | Brooks | 235/462 |

FOREIGN PATENT DOCUMENTS

| | | |
|---|---|---|
| 0199252 | 10/1986 | European Pat. Off. . |
| PCT/US92/06992 | 8/1992 | WIPO . |

OTHER PUBLICATIONS

Seideman, T., "Bar Codes Sweep The World" (1993) Invention & Technology, pp. 57–63.
Tokasz, J., (Apr. 19, 1993) "NYPIRG: Scanner bill doesn't add up" Ithaca Journal, p. 3A.
O'Connell, V., (1993), "Don't Get Cheated by Supermarket Scanners" Money, pp. 132–138.

Primary Examiner—Donald T. Hajec
Assistant Examiner—Mark Tremblay
Attorney, Agent, or Firm—Barnard, Brown & Michaels

[57] ABSTRACT

A price verification method for retail stores using shelf pricing, and apparatus therefor, in which the shelf labels are provided with an extended bar code having the item number and price of the item. A remote unit scans the item number and price, and uses the item number to look up the item in a database which is identical to the store checkout scanner database, and compares the shelf price to the database price. If they are not the same, a new shelf label may be printed immediately. Also, the UPC or other barcode on the product itself is scanned and compared to the shelf price label.

25 Claims, 3 Drawing Sheets

SHELF PRICE LABEL AND PRODUCT PLACEMENT VERIFICATION METHOD AND APPARATUS

REFERENCE TO RELATED APPLICATION

This is a continuation-in-part patent application of application Ser. No. 08/058,426, entitled "SHELF PRICE LABEL VERIFICATION APPARATUS AND METHOD", which was filed May 7, 1993, now U.S. Pat. No. 5,382,779.

FIELD OF THE INVENTION

The invention pertains to the field of methods and devices for retail price tag generation and maintenance. More particularly, the invention pertains to an improved shelf price label, methods and apparatus for confirming the accuracy of shelf pricing and product placement in a retail environment, and for printing replacement shelf price tags for those with incorrect prices.

BACKGROUND OF THE INVENTION

The parent to this application, entitled "SHELF PRICE LABEL VERIFICATION APPARATUS AND METHOD," taught the basic apparatus and method of verification used in this Continuation-in-part application. The present invention uses the apparatus and method disclosed in the parent with the additional function or step of verifying that the product on the shelf matches the shelf price label.

The adoption of the Universal Product Code (UPC) in April 1973 transformed bar codes from a technological curiosity into a business necessity. Before the UPC, every company had its own way of identifying its products. Some used letters, some numbers, some both, and some had no codes at all. Moreover, before the UPC, various bar code systems were in use, all incompatible. After the UPC, any bar code on any product could be scanned and interpreted in every suitably equipped store in the company.

The UPC comprises a twelve-digit bar code which is split into two halves. The first digit is always 0, except for products like meat and produce that have a variable price dependent upon weight, and a few other special types of items. The first five digits after the "0" are the manufacturer's code, the next five are the product code, and the last is a "check digit" used to verify that the preceding digits have been scanned properly. Hidden cues in the structure of the code tell the scanner which end is which, so it can be scanned in either direction.

In certain products such as meat, etc., the first part of the code identifies the type of item (chuck steak, chicken wings, etc.), and the second half gives the price. Books, too, are given the price coding in the second code group, and a part of the ISBN code is appended in another, smaller, code group.

Manufacturers register their codes with the Uniform Code Council (UCC) to get an identifier code for their companies, then register each of their products. Thus, each package that passes over a checkout stand has its own unique identification number.

Standardization made it worth the expense for manufacturers to put the symbol on their packages and for printers to develop the new types of ink, plates and other technology to reproduce the codes with the exact tolerance required. Despite the estimated $200,000 per store cost of scanning equipment, and the potential $200 million annual cost to manufacturers, tests showed the UPC system would pay for itself in a few years.

Once the level of 85% identification of products was reached in the late 1970's, sales of scanner systems took off rapidly. In 1978, less than 1% of all grocery stores had scanners. By mid-1981 the figure was 10%, three years later it was 33%, and today over 60% of all grocery stores in the nation are using checkout scanners. Other types of stores have begun to follow, led by discount chains such as K-mart and Walmart. (The preceding discussion is adapted from "Bar Codes Sweep the World", *Invention and Technology*, Spring 1993, pp. 57–63).

Although originally sold as a way of reducing time and errors at the checkout without adding register employees, stores soon discovered that one of the primary sources of savings in the use of the UPC system is that it is no longer necessary for a store to pay an employee to individually tag each and every item in the store. Instead, a single price label is placed on the shelf next to (or under) the items to be sold. This also allows price changes to be made without having to retag hundreds of items, and eliminates the possibility of mis-tagged items.

While ideal for the retailer, shelf pricing has its disadvantages from the consumer's point of view. Since there is no price on the item, the checkout scanner (which is working from a central store database of prices) will charge the customer based on the database price, without reference to the shelf price. Unless he or she notes the price from the shelf on each and every item, a consumer has no way of knowing if the shelf price is the price he or she is actually charged at the register.

There may be some reason for consumers to mistrust shelf pricing. According to an article in the *Ithaca (NY) Journal*, recent studies by Information Week claimed that American consumers were overcharged some $2.5 Billion in 1992 ("NYPIRG: Scanner bill doesn't add up", *Ithaca Journal*, Apr. 19, 1993, page 3A), and a study in Money Magazine estimated that scanner errors account for more than half of supermarket profits, giving consumers a 1-in-10 chance of being overcharged on each visit to one of the 30% of stores that routinely overcharge. ("Don't Get Cheated by Supermarket Scanners", *Money Magazine*, April, 1993, pp. 32–138)

The *Money Magazine* article (p. 138) indicates that Connecticut exempts stores from a coding law if the store uses computerized shelf pricing. To this inventor's knowledge, the "electronic unit price shelf tags" are, in fact, small electronic readouts under each item in the store which directly display the scanner database price for each item. This is obviously a huge investment for a store, not to mention the time and trouble to reprogram a system when moving items from one shelf to another.

Legislation requiring stores to guarantee the accuracy of shelf prices against scanner prices may be expected in the future. Tompkins County (NY) is currently holding hearings on such a law requiring a 98% accuracy rate, and New York, among other states, is considering it. Stores approve of a scanner accuracy law, since it allows them to continue shelf pricing in the absence of item pricing, but they will need some way of checking the shelf prices to avoid penalties under the law. Having an employee manually check every shelf label against a price list will eliminate some of the gains made by going to shelf pricing in the first place. Also, counties or states will need some way of checking shelf prices against scanner prices to enforce any law which eventually goes into effect.

Watson, et.al., U.S. Pat. No. 4,654,514, recognizes the problem of incorrect shelf prices and the difficulty of keeping them up to date. He solves the problem by eliminating the shelf price and giving the consumer a shelf mounted scanner to scan the UPC on the item, displaying the correct price from a database downloaded from the store host. This system just makes the problem worse, from the point of view of the consumer, since this means no prices are displayed at all, neither on the shelf nor on the item, and the customer must scan every item on the shelf to get price comparisons. The confusion on a busy shopping night can be easily imagined.

Tashiro, et.al., U.S. Pat. No. 5,065,002, provides a portable unit having a bar code reader and printer, which reads bar codes and then prints them. No particular application is disclosed, nor are any characteristics or uses of the bar codes scanned. There is no processing of the data read, no database of prices and no price lookup. Bar codes are scanned by a hand-held scanner wand, stored in the wand, and dumped to the printer for duplication.

SUMMARY OF THE INVENTION

Under the teachings of the invention, each shelf label will be printed with the UPC or other barcoded identification for the product, extended with an additional code group giving the price for the item. A portable verification unit having a scanner is used to scan the label, including the price. The UPC is used to look up the correct price in the store database which is the same as that used by the store's checkout scanners (or a full or partial copy of the database in the portable unit), and the two prices are compared. In the case of an error, a new label bearing the correct price may be printed immediately. Also, the UPC or other barcode on the product itself is scanned and compared to the shelf price label.

DESCRIPTION OF THE PREFERRED EMBODIMENT

Overview of the Invention

Figure 1:
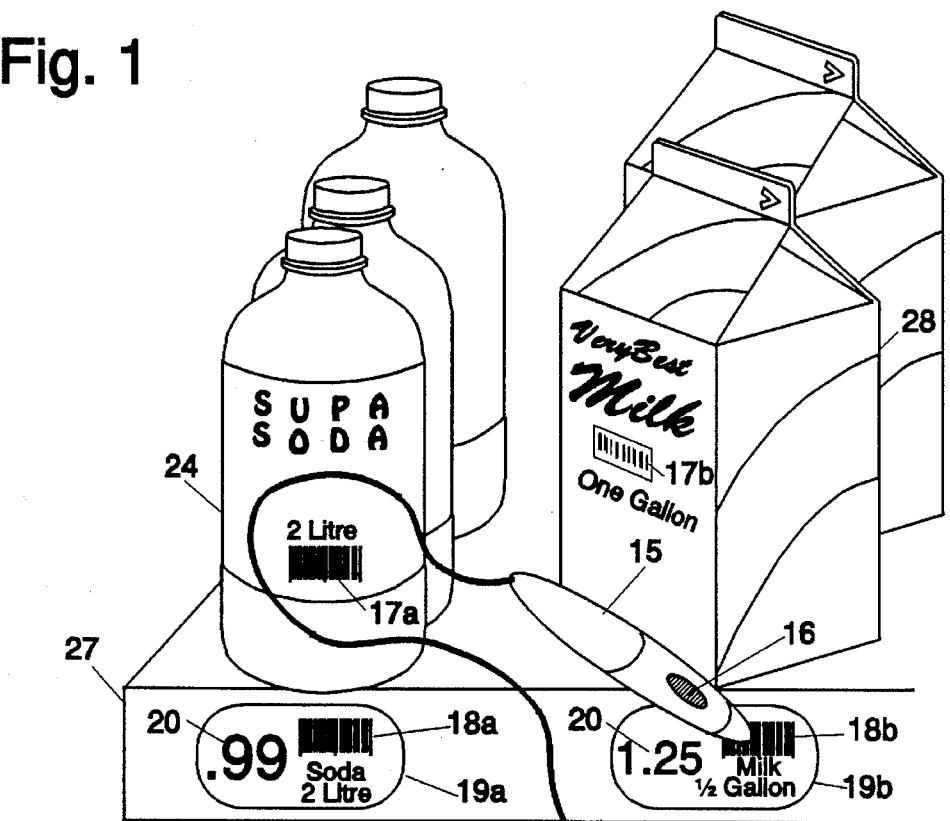
FIG. 1 shows the apparatus of the invention in use, scanning a shelf label.
Figure 1:
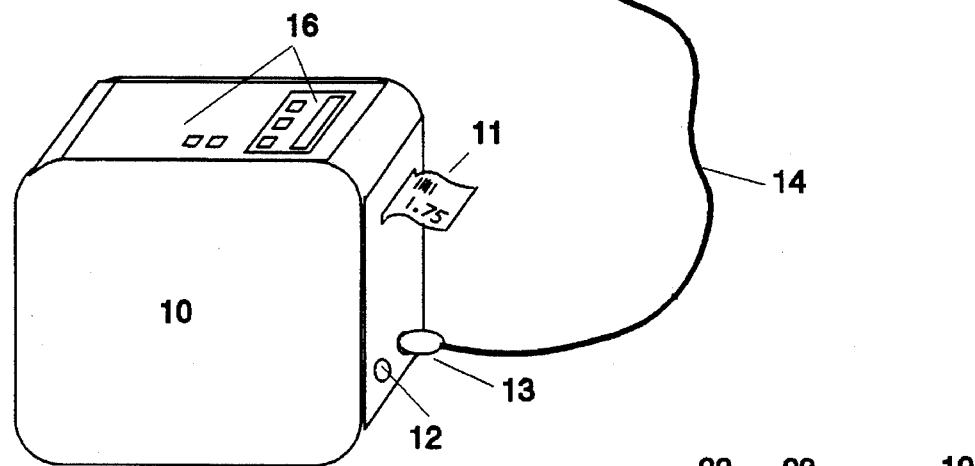

FIG. 1 shows the preferred embodiment of the invention as it might be used in a store.

Two products are shown in the figure, bottles of soda (24) and milk cartons (28), on a representative shelf (27). In front of the products are shelf labels: (19a) for the soda, and (19b) for the milk. Each label gives the price (20) of the item, in large numbers for the consumer to read. Each label also has a bar code (18a)(18b), which will be discussed in greater detail below. Each item has the standard UPC barcode—(17a) on the soda (24), and (17b) on the milk (28). It will be noted that the shelf label (19b) for the milk (28) does not match the product, in that the label (19b) recites "½ Gallon Milk" and the actual container is "1 Gallon".

The invention is implemented using a portable verification unit (10), which incorporates the various elements necessary to practice the invention. The verification unit may be mounted on or placed in a roll-around cart or shopping cart, or the entire unit could be made small enough to hang over the shoulder of the unit operator on a strap.

Figure 5:
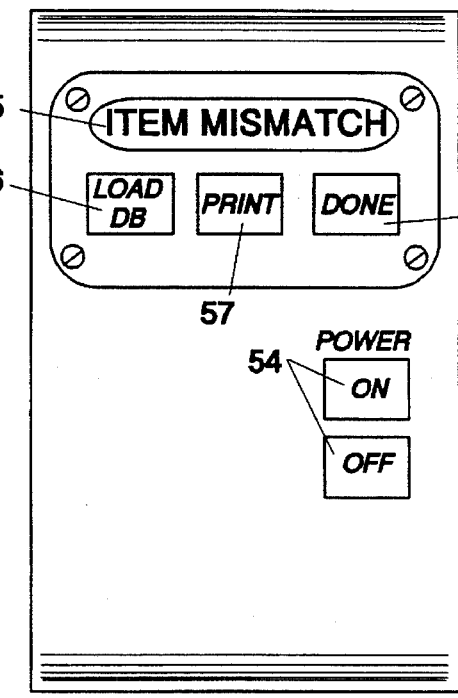
FIG. 5 shows a detail of the top of the apparatus of the invention.

The verification unit (10) has a top panel (16) shown in detail on FIG. 5. The panel (16) has a readout device (55) or indicator which would preferably be of the alphanumeric LCD type which is commonly available from many sources, and requires low power drain and simple, standardized interfacing. However, other display devices such as LED's, gas or plasma discharge, or incandescent, could be used within the teachings of the invention. Since the number of messages to be conveyed would be limited, the readout could be replaced with a number of LED's or indicator lights next to appropriate labels ("Item OK", "Item Mismatch", "Price OK", "Price Error", "Item Not Found", etc.), if desired.

A number of switches, in the form of pushbuttons, will preferably be mounted on the top panel. Shown are buttons for "Load Database" (56), "Print" (57), and "Done" (58), as well as ON/OFF switches (or a single rocker or toggle switch) for system power (54). The use of these switches will become evident later. Switches of many kinds are available, and the choice of type will be obvious to one skilled in the art.

The verification unit will have a printer (11) with paper supply, to allow replacement shelf price labels to be printed if an error is detected. The printer will preferably be built into the verification unit, but it will be understood by one skilled in the art that the printer might be in a separate box and attached to the verification unit by any convenient means such as cables, IR remote, etc. Many kinds of small, low-power printers are available, including thermal, inkjet or inked-ribbon, any of which can be used within the teachings of the invention. The printer must be capable of printing shelf labels or paper slips, including the printing of a bar code which can be read by a scanner. This would not pose a problem with most dot-matrix type printers known today. The printers designed for portable calculators or label makers would be usable within the teachings of the invention. The exact choice of printer for a specific application would be determined by factors of price, power requirements, and the type of label to be printed, all of which would be within the capability of any person skilled in the art.

The verification unit is equipped with two connectors (12) and (13). Connector (12) is for communications with the store's computer, to download the UPC/price database into the verification unit's internal storage. This connector would preferably be one of the industry-standard connectors, such as the 25-pin DB-25, nine-pin DB-9, or one of the five- or nine-pin DIN connectors.

The second connector (13) is for the scanning device, here shown as a wand (15), connected to the main verification unit by a cord (14). In an alternate embodiment, the cord (14) could be replaced by a remote means such as IR or RF, which would allow a larger and heavier verification unit to be mounted on a roll-around cart, with full freedom to the employee doing the sensing, so long as he remained in range of the cart. The scanning device is shown as a wand, which is available from many sources, however one of the scanning guns available on the market could be used instead. The wand is easier to use in this application, as it can simply be run down the shelf in contact with the shelf edge and scanning each label as it passes. The gun would require the employee to aim accurately and "shoot" each label. In some applications, the gun might be preferable, and the exact form of the scanning device can vary within the teachings of the invention.

The wand (15) or gun is preferably provided with a switch (16) or trigger to signal the verification unit that scanning of a label has begun, and thus to start the laser beam for scanning. This switch may be omitted, if desired. The trade-off between use of this switch (16) and continuous scanning would be obvious to one skilled in the art, including such factors as power drain, laser life, dangers from visible laser beams, etc.

Figure 2:
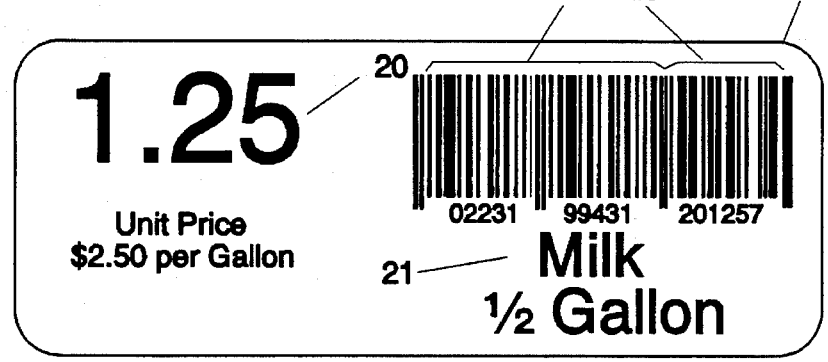
FIG. 2 shows a detail of a shelf label adapted for use with the method of the invention.

FIG. 2 shows a shelf label (19) modified for use with the invention. The label will include pricing information (20) for the customer to read, possibly including a unit price as shown. It will also include a product description (21), so the customer can determine what product the price label refers to. An extended UPC for the product is printed on the label. The standard UPC, identifying the product as described above (22), is followed by an additional barcode group (23) giving the price of the item. Preferably, this additional barcode follows the same format as the price portion of the standard UPC price code used for priced items such as meat or the like, which eliminates the need to define an additional code and uses standard UPC coding-and decoding methods.

It should be noted that the exact coding shown in the drawing and described herein is given for example only, and that any scanner-readable coding which gives both the item identification and price will work within the teachings of the invention. The "UPC" bars in FIGS. 1 and 2 of the drawing do not actually relate to the products shown, nor do they form a valid UPC barcode, but are provided for drawing purposes only.

Internal Details of the Apparatus

Figure 3:
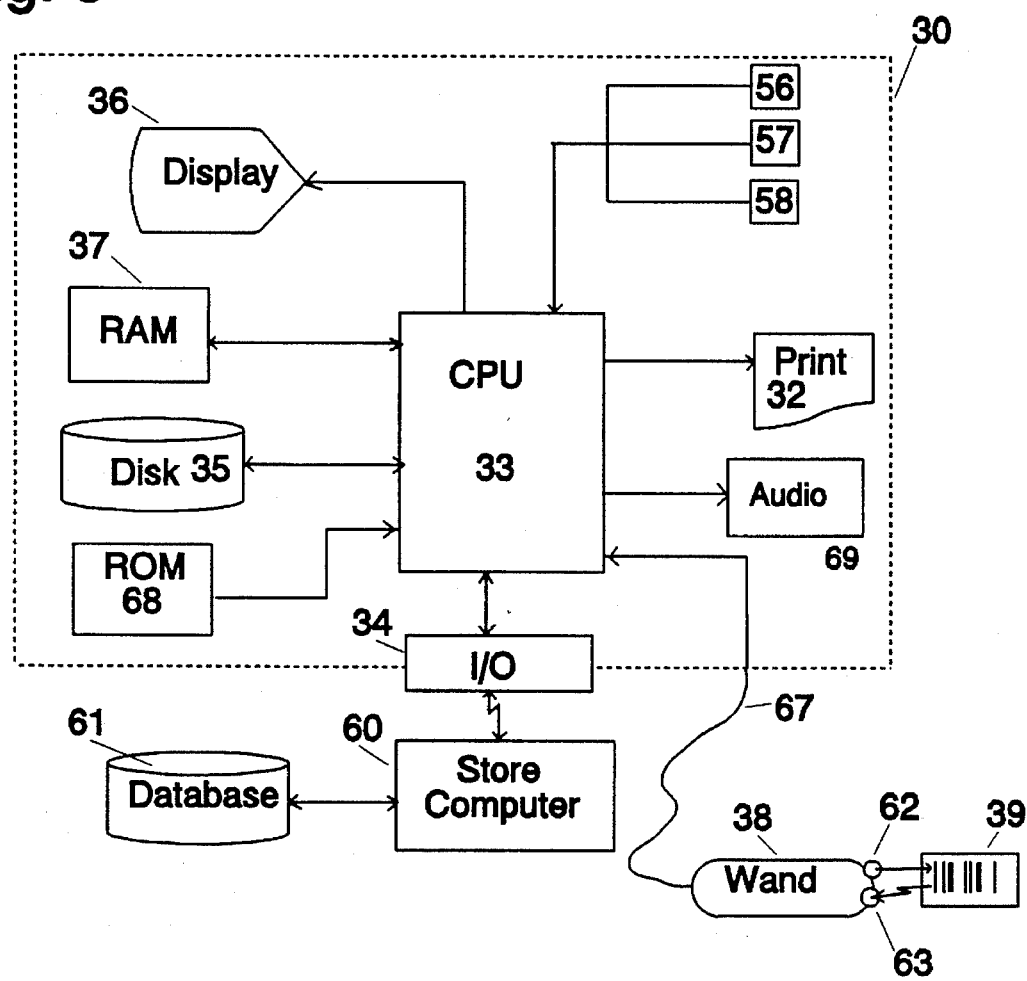
FIG. 3 shows a block diagram of the apparatus of the invention.

Referring now to FIG. 3, the block diagram of the portable verification unit itself is enclosed in dotted lines (30). Not shown is the power supply for the verification unit, which will preferably comprise a rechargeable battery pack of sufficient voltage and amp/hour rating to power the verification unit for several hours. Gelled-electrolyte lead-acid ("Gel Cell") or Nickel-Cadmium (NiCd) batteries would be preferable for this application. The choice of specific power supply will depend on the electronics chosen for the various components in a manner familiar to one skilled in the art.

The verification unit is seen to comprise a CPU (33), which can be any of the many (preferably low power) general-purpose VLSI microprocessor "chips" available, such as the 80C386 or the like. These devices are currently widely used in portable "laptop" computers, and the same advantages which make them well adapted for that application are also important here.

The basic microprogram for the verification unit can be "burned" into Read Only Memory (ROM) in the chip itself, or external ROM (68) can be provided as shown. The ROM (68) contains the programming necessary to allow the CPU to perform the functions required. If desired, the ROM need contain no more code than that necessary to instruct the verification unit to download additional code into the Random Access Memory (RAM) (37) from the store's computer, when the price and identification data is loaded into the disk (35).

The RAM (37) contains the short-term storage needed for the operation of the verification unit, and possibly elements of the CPU programming which are not ROM-resident. Any RAM which will interface with the CPU chosen is usable, and the specific chips chosen will vary based on the processor, the state of the art at the time, power drain, required memory capacity, etc. At the present time, 1 Megabyte CMOS low-drain memory would be the most likely choice.

The "disk" (35) is used to contain the price and product identification information downloaded from the store's main computer. Although called a "disk" in this specification, it will be understood by one skilled in the art that the exact form of this mass storage medium will vary within the teachings of the invention as the technology of portable mass storage evolves. At present, large capacity rotating magnetic disks (on the order of hundreds of megabytes) are relatively inexpensive and easily available. In the future, this may be replaced by solid state memory, optical disks, bubble memory, or some other technology yet to be developed. If desired, large chains might distribute the price database on Compact Disk Read-Only Memory (CDROM), which could either be physically used in the verification unit, or downloaded onto a conventional magnetic or other "disk" in the verification unit.

The information stored in the disk will contain, at a minimum, the UPC key and price for every item to be verified. Preferably, the database will also contain such information as a description of the item, quantity of sale (14-ounce box, ½ gallon bottle, 50-count package, etc.), and standard unit for unit pricing ("each", "ounce", "10-count", etc.), so that all of the information necessary to produce the price label will be immediately available in mass storage. Preferably the data will be stored in some compressed format to save on disk space and transfer/access time.

If the "disk" storage is limited, it will be understood that the database need not contain all of the UPC information for the entire store. By planning how the store is to be checked, the database could be downloaded in sections (i.e. all canned goods, all cereals, dairy/produce, etc.) and the price checking would then be done by section of the store. As a practical matter, this would have little or no effect upon the operation of the system, since stores tend to be arranged in related aisles, and it is most likely that an entire section would be scanned at a time, before moving on to unrelated merchandise. If the store's computer contains such information, the data could specifically be downloaded by aisle or group of aisles.

It is not necessary for the data base to reside in the verification unit, though this is preferred. If desired, the "disk" in the verification unit can be eliminated, and the "I/O" link (34) in FIG. 3 between the verification unit (30) and the store computer (60) would become a remote link, using whatever radio (RF) or infrared (IR) technology is current at the time. For example, the "wireless LAN modem" technology could be used to establish the link, or a duplex simultaneous transmission/reception path on one or more frequencies could be used with conventional 4-wire modems. The operation of the invention would not change, except that the "download database" step (42) of FIG. 4 would not be needed, and the lookup would actually be performed in the store's computer database via the remote link.

The display (36), switches (64), (65) and (66), wand (38), cord (67), and printer (32) were discussed above.

The three switches shown would be used to initiate a database download (56), control the printer (57) and signal that the scanning process is completed (58). Since these switches will merely provide contact-closure signals to the CPU, the exact functions of the switches will be under software control. For example, the "print" switch could be programmed to cycle through a series of print modes, signaled by appropriate messages on the display (i.e., "No Print", "Print Always", "Print on Price Error"). The CPU could be programmed to print a summary on detecting a press of the "done" key, etc. Other uses for the switches will be evident to one skilled in the art.

The wand (38) or other scanning means will have a light source (62), preferably an IR laser diode for the wand application (a gun would use a higher-power visible laser) which illuminates the bar code (39), and a photodetector (63) to detect the reflected light and thus "read" the code.

Preferably, the verification unit will include an audible alarm (69). This could be simply a speaker driven from a port on the CPU, as is used in the common PC speaker system, or it could be a piezoelectric alarm or "Sonalert" module which are commonly available.

The store computer (60) would most likely be the same computer as now exists to drive the checkout scanners. It maintains the database (61) of information on the products. The I/O interface (34) adapts the verification unit to the store computer in any way convenient to the designer and the computer system. Preferably, this will be an industry-standard serial RS-232 or RS-422 interface running at the maximum available baud rate, or a standard bi-directional Centronics parallel interface might provide a higher data rate. The volume of information to be loaded into the verification unit will dictate that the highest possible data transfer rate, perhaps including some compression, be used to minimize the transfer time. If desired, while the data is being downloaded, the internal batteries can be charging.

The preferred embodiment of the invention has been described herein in the form of a specialized apparatus, specially built for the application. However, it will be understood that one skilled in the art could adapt a conventional general-purpose portable computer, such as one of the many "laptop" or "notebook" PCs on the market today, to practice the invention.

Operation of the Invention

Figure 4:
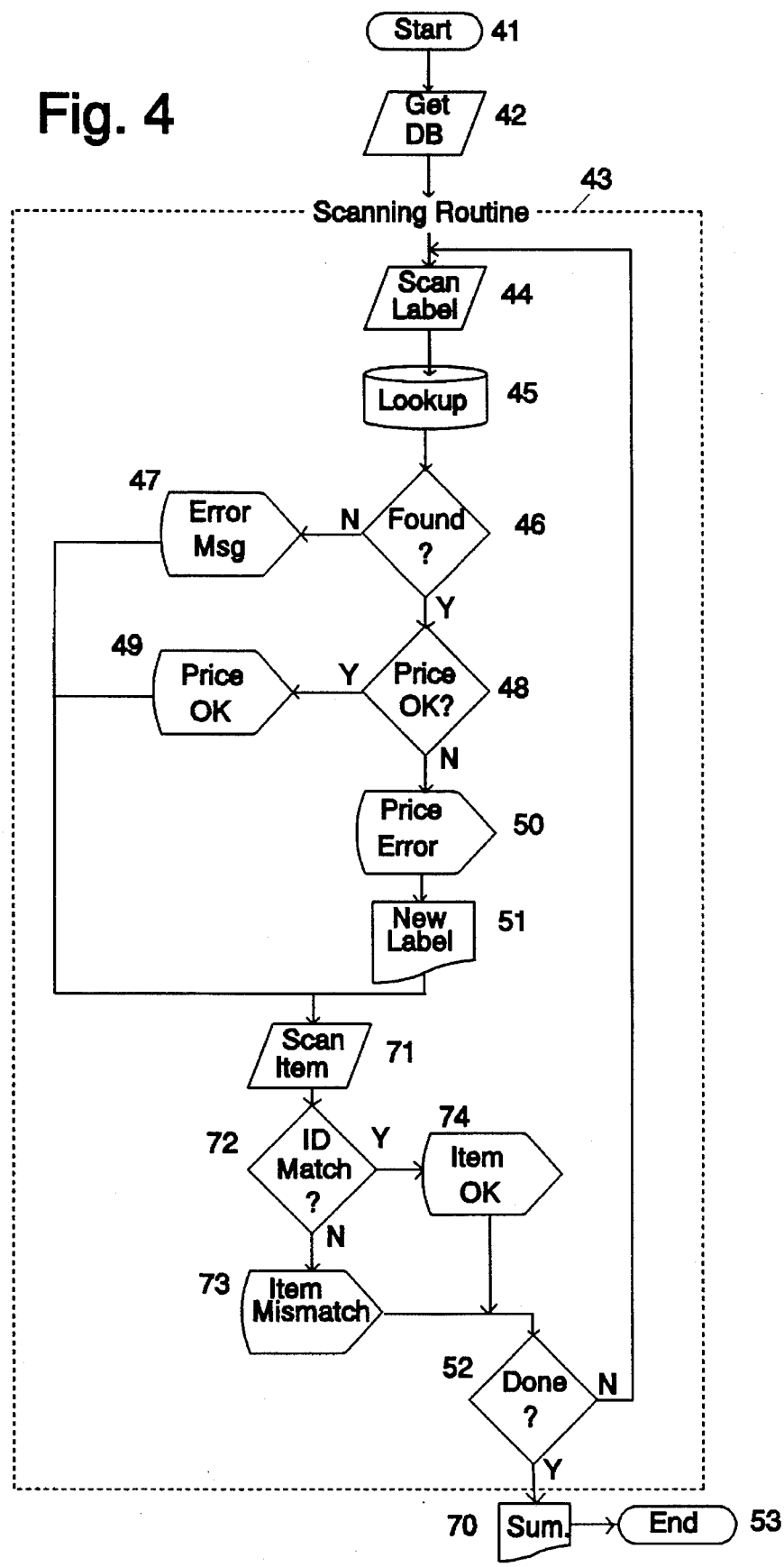
FIG. 4 shows a flowchart of the method of the invention.

FIG. 4 shows a flowchart of the basic operation of the method of the invention. This flowchart is intended to illustrate the basic operation of the invention. Additional variations in the flowchart will be evident to one skilled in the art, and some will be discussed below.

If the system is designed for the correct store price database to reside in the portable verification unit, the operation starts (41) with the download of the database from the store computer (42). This will probably be initiated by plugging the verification unit into the store computer (60), running an appropriate program on the store computer, and pressing the "Load DB" button (56) on the verification unit. When step (42) is complete, the verification unit can display an appropriate message such as "DOWNLOAD COMPLETE" on the display (36).

If a remote data link to the store computer used to control the checkout scanners replaces the internally stored database, then the "download database" step (42) would be replaced by "establish remote link", with the rest of the method proceeding as described below.

The basic scanning routine of the invention is enclosed in dotted lines (43). The operations before and after this routine are shown in summary fashion only, as the exact details of database loading, etc, will vary by the hardware and software being used by the store, within the ability of one skilled in the art.

The scan routine (43) is started when the employee takes the verification unit out into the store to begin scanning. The employee scans a shelf-price label (44) pressing the trigger switch (16) on the wand (15) or gun. This causes the scanning means to read the label, and the UPC (22) and price (23) from the label are decoded by the CPU and loaded into the RAM (37). The CPU then uses the UPC as a key to look up (retrieve) an item record (45) in the database on the disk (35). If the item record is not found (46), the CPU will cause the display to show an appropriate message ("ITEM NOT FOUND") and preferably to emit an audible warning. The routine then falls through to the point where the item label is scanned (71). Alternatively, if the decision is made that label items which cannot be found need not be verified for match with the actual item, the routine could ignore the item scan part and instead check for the "done" switch (52).

If the item record was found (46), the CPU then (48) compares the price scanned from the label (23) to the price from the item record retrieved from the database stored on disk (35). If the comparison indicates that the price is correct, the CPU displays a message to that effect (49) ("PRICE OK"), optionally gives an audible indication, and falls through to the item scan (71), as described above.

If the price comparison was not successful (48), the CPU displays (50) an appropriate message ("PRICE ERROR") with optional audible warning, and prints (51) a new label, using the information from the database for the description, units, etc. The printer can be set up to produce the entire label "from scratch", using blank labels or paper. If desired, the printer could also be loaded with preprinted forms bearing the store's logo, possibly with color accents or advertising material, which would also have the added advantage of making it difficult to forge the price labels.

The employee can then replace the erroneous shelf price label with the newly printed one, and move on to the next label.

The next step is for the employee to use the wand (15) to scan the UPC on the item (71) which is, in theory, related to the label. When the UPC is scanned, the identification is compared (72) with the identification which was previously scanned from the shelf label. If the comparison is passed (i.e. the ID's match) the CPU generates some appropriate message (74) such as "Item OK", possibly with an associated audio tone, and the routine proceeds to check the "done" switch (52).

If, as is shown for the milk (28) in the example of FIG. 1, the shelf label identification does not match the actual product UPC, then the CPU displays an appropriate error message (73) ("Item Mismatch"), with an optional audio alarm. The employee is thus prompted to check the relative placement of the product and/or label and move one or the other so that they correspond. The routine then proceeds to check the "done" switch (52).

If the "done" indication (52) is true (i.e. the "done" button was pushed) the routine can simply end, return to the "start" condition ("READY FOR DOWNLOAD"), or print a summary listing of scans and errors (70), or some combination of these.

As discussed above, several print modes could be programmed into the verification unit within the teachings of the invention. The modifications to the flowchart of FIG. 4 for the various modes discussed are simple. The basic flowchart of FIG. 4 shows the "Print on Price Error" mode of operation. To implement the "Print Always" mode, check after the "Price OK" display (49) for the "Print Always" indicator. If true, go to block (51) (Print new label). To implement a "No Print" mode, check for a "no print" indication. If true, then block (51) is bypassed.

If the system designer desires, the order of the individual steps in the method could be varied within the teachings of the invention. For example, the scan item step (71) could be done right after or before the scan label step (44). The comparison of the identifications could then be done before the price lookup. This would double-check that the product placement is correct before checking for the accuracy of the price on the label. In fact, the CPU could be programmed to recognize the difference between the two (the item UPC does not have the price code), and the two scans could be done in either order. The comparison to the price database would then be held pending the completion of both scans. Other variations are possible.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. A method of shelf price and product placement verification for a store of the type utilizing checkout scanners and shelf pricing, comprising the steps of:
   a) placing shelf price labels for each of a plurality of items in the store, each label having at least an item identification printed in barcoded form, and a price presented in both barcoded and human-readable form, and each item having at least an item identification printed in barcoded form;
   b) scanning the shelf label, reading at least the item identification and shelf price;
   c) looking up an item record from a store checkout scanner price database using the item identification, the item record containing at least the price for the item which would be used by the store checkout scanner;
   d) comparing the shelf price from the scanned label to the price from the store checkout scanner price database;
   e) if the shelf price from the scanned label is not equal to the price from the store checkout scanner price database, presenting an indication of a price error to an operator;
   f) scanning the item, reading at least the item identification;
   g) comparing the item identification from the scanned label and the item identification from the scanned item; and
   h) if the item identification from the scanned label and the item identification from the scanned item do not match, presenting an indication of an item mismatch to the operator.

2. The method of claim 1, further comprising, in step "e" thereof, printing a new shelf price label containing at least the item identification printed in barcoded form, and the correct price from the store price database presented in both barcoded and human-readable form.

3. The method of claim 1 in which the item identification in barcoded form printed on the shelf price label is the UPC barcode for the item.

4. The method of claim 3 in which the UPC barcode for the item is extended to also barcode the price of the item.

5. The method of claim 1 in which the item identification in barcoded form printed on the item is the UPC barcode for the item.

6. The method of claim 1, in which steps b) and f) are executed one after the other in either order, and further comprising the step, after completion of both scans, such that the scan of step b) is defined as the scan in which the price code is detected in the scanned data.

7. A portable shelf price and product placement verification unit, for use in a system wherein a plurality of items in a store are identified with shelf price labels, each label having at least an item identification printed in barcoded form, and a price presented in both barcoded and human-readable form, and each item having at least an item identification printed in barcoded form, comprising:
   a) scanner means for reading at least the item identification and shelf price from the barcode on the shelf price label and the barcode on the item;
   b) memory means for storing at least the scanned item identification and the scanned shelf price from the barcode on the shelf price label;
   c) database means for storing a plurality of item records, each record representing an item and containing at least an item identification and store checkout scanner price;
   d) indicator means for communicating with the operator of the verification unit,
   e) processor means for controlling the scanner means, memory means, indicator means and database means, such that:
      i) when the scanner means has scanned a shelf price label, the processor means loads the item identification from the shelf price label into the memory means, looks up the item identification in the memory means in the database means, retrieves the associated item record for the item identified by the item identification, and compares the scanned shelf price and the price from the item record, and, if the shelf price and item record prices are not equal, provides a price error indication to the operator of the verification unit using the indicator means; and
      ii) when the scanner means has scanned both the shelf price label and an item identification from an item, the processor means loads the item identification from the item into the memory means, compares it to the item identification from the shelf price label, and, if the item identification from the shelf price label and the item identification from the item do not match, provides an item mismatch indication to the operator of the verification unit using the indicator means.

8. The verification unit of claim 7, further comprising a printer, capable of printing the barcode and human-readable information on a shelf price label, operatively connected to the processor means such that when the shelf price and item record prices are not equal the processor means commands the printer to print a new shelf price label having at least the item identification printed in barcoded form, and the item record price presented in both barcoded and human-readable form.

9. The verification unit of claim 7 in which the item identification in barcoded form printed on the shelf price label is the UPC barcode for the item.

10. The verification unit of claim 9 in which the UPC barcode for the item is extended to also include a barcode for the price of the item.

11. The verification unit of claim 10 in which the store has a store computer controlling a plurality of checkout registers for scanning purchases by consumers, the database means is the database associated with the store computer which controls the checkout registers, and the portable verification unit further comprises a remote data link between the portable verification unit and the store computer.

12. The verification unit of claim 11 in which the remote data link uses radio frequency (RF) communications.

13. The verification unit of claim 11 in which the remote data link uses infrared (IR) communications.

14. The verification unit of claim 7 in which the item identification in barcoded form printed on the item is the UPC barcode for the item.

15. The verification unit of claim 7 in which the price error indication is an audible alarm.

16. The verification unit of claim 7 in which the price error indication is a visual display.

17. The verification unit of claim 7 in which the item mismatch indication is an audible alarm.

18. The verification unit of claim 7 in which the item mismatch indication is a visual display.

19. The verification unit of claim 7 in which the database means is a mass storage device located in the portable verification unit.

20. The verification unit of claim 19 in which the mass storage device is a magnetic disk drive.

21. The verification unit of claim 19 in which the mass storage device is an optical disk drive.

22. The verification unit of claim 19 in which the mass storage device is solid state Random Access Memory (RAM).

23. The verification unit of claim 19 in which the portable verification unit further comprises input/output means for communicating with a store computer, whereby the database of item records can be downloaded from the store computer to the database means of the portable verification unit.

24. The verification unit of claim 7 in which the indicator means also indicates when the shelf price and item record price are equal.

25. The verification unit of claim 7 in which the indicator means also indicates when the item identification from the shelf price label and the item identification from the item match.

* * * * *